US012752226B2

(12) United States Patent
Koo et al.

(10) Patent No.: US 12,752,226 B2
(45) Date of Patent: Oct. 6, 2026

(54) PHOTOCATALYTIC AIR CONDITIONING FILTER MODULE WITH ANTIVIRAL PERFORMANCE

(71) Applicant: KOREA INSTITUTE OF CIVIL ENGINEERING AND BUILDING TECHNOLOGY, Goyang-si (KR)

(72) Inventors: Hyun-Bon Koo, Goyang-si (KR); Jong-Won Kwark, Goyang-si (KR); Seong-Jun Kim, Goyang-si (KR)

(73) Assignee: KOREA INSTITUTE OF CIVIL ENGINEERING AND BUILDING TECHNOLOGY, Goyang-si (KR)

( * ) Notice: Subject to any disclaimer, the term of this patent is extended or adjusted under 35 U.S.C. 154(b) by 752 days.

(21) Appl. No.: 17/912,023

(22) PCT Filed: Mar. 16, 2021

(86) PCT No.: PCT/KR2021/003227
§ 371 (c)(1),
(2) Date: Sep. 15, 2022

(87) PCT Pub. No.: WO2021/187860
PCT Pub. Date: Sep. 23, 2021

(65) Prior Publication Data

US 2023/0133151 A1 May 4, 2023

(30) Foreign Application Priority Data

Mar. 16, 2020 (KR) ........................ 10-2020-0031932
Mar. 15, 2021 (KR) ........................ 10-2021-0033587

(51) Int. Cl.
*B01D 46/00* (2022.01)
*B01D 49/00* (2006.01)

(52) U.S. Cl.
CPC ......... *B01D 46/0002* (2013.01); *B01D 49/00* (2013.01); *B01D 2259/802* (2013.01); *B01D 2265/00* (2013.01)

(58) Field of Classification Search
CPC ................ B01D 46/0002; B01D 49/00; B01D 2259/802; B01D 2265/00; F24F 8/22;
(Continued)

(56) References Cited

U.S. PATENT DOCUMENTS 5,933,702 A 8/1999 Goswami
2002/0160913 A1* 10/2002 Sangiovanni ............ B01J 35/39 502/527.19
2018/0104374 A1 4/2018 Kim et al.

FOREIGN PATENT DOCUMENTS

JP S4121265 Y1 10/1966
KR 20150089704 8/2015
(Continued)

OTHER PUBLICATIONS

International Search Report—PCT/KR2021/003227 dated Jun. 28, 2021.

*Primary Examiner* — Qianping He
(74) *Attorney, Agent, or Firm* — Bridgeway IP Law Group, PLLC; Jihun Kim

(57) ABSTRACT

Provided is a photocatalytic air-conditioning filter module, which is applied to a target space, including a first casing partition wall part having lattice-shaped spaces where photocatalytic balls are positioned, a second casing partition wall part connected to a rear end of the first casing partition wall part and having lattice-shaped spaces positioned to be staggered with respect to the lattice-shaped spaces of the first casing partition wall part, the photocatalytic balls accommodated in the lattice-shaped spaces of the first and second casing partition wall parts, a first cover configured to cover a front surface of the first casing partition wall part and
(Continued)

prevent the photocatalytic balls from separating from the first casing partition wall part, and a second cover configured to cover a rear surface of the second casing partition wall part and prevent the photocatalytic balls from separating from the second casing partition wall part.

8 Claims, 14 Drawing Sheets

(58) Field of Classification Search
CPC ..... F24F 8/10; F24F 8/167; A61L 9/18; A61L 9/20; A61L 2209/14; A61L 2209/16; Y02A 50/20
USPC ...................................... 55/482; 96/134, 233
See application file for complete search history.

(56) References Cited

FOREIGN PATENT DOCUMENTS

| | | | | | |
|---|---|---|---|---|---|
| KR | 20150089704 | A | * | 8/2015 | |
| KR | 20160039073 | | | 4/2016 | |
| KR | 20160098631 | A | * | 4/2016 | |
| KR | 20160039073 | A | * | 8/2016 | |
| KR | 20160098631 | | | 8/2016 | |
| KR | 20170014483 | A | | 2/2017 | |
| KR | 20170026966 | | | 3/2017 | |
| KR | 101800219 | B1 | | 11/2017 | |
| KR | 20180043163 | A | * | 4/2018 | ......... B01D 53/8671 |
| WO | 2018016115 | A1 | | 1/2018 | |

* cited by examiner (a)

(b)

PHOTOCATALYTIC AIR CONDITIONING FILTER MODULE WITH ANTIVIRAL PERFORMANCE

The present invention has been developed as a result of executing a project of the Korea Institute of Civil Engineering and Building Technology (KICT), titled "Development of Modular Integrated Equipment System for Emergency Response to Virus Disaster Development of Modular Facilities and Quarantine System for Preventing Spread of Infectious Diseases and Rapid Response" (Project No.: 20220238-001, NTIS No.: 1711151918).

TECHNICAL FIELD

The present application relates to a photocatalytic air-conditioning filter module having antiviral performance.

BACKGROUND ART

In recent years, unexpected infectious diseases such as severe acute respiratory syndrome (SARS), middle east respiratory syndrome (MERS), and recent Corona 19 have been frequently spread because spaces required to prevent infectious diseases are contaminated by infectious sources (viruses or bacteria).

Thus, the importance of managing contamination caused by infectious sources (viruses or bacteria) is emphasized in immigration facilities such as airports, ports, etc., which are the routes of the inflow of overseas infectious diseases; medical facilities such as hospitals where patients with infectious diseases are concentrated; facilities for the weak such as nursing homes, daycare centers where the sensitive persons with weak immunity live; multi-use facilities such as public facilities that many unspecified people frequently enter and exit; and transportation means such as cars, trains, aircraft, and ships frequently used by many unspecified people.

In particular, because the spreading rate and impact of the infectious source (virus or bacteria) may be very high when the infectious source spreads into the air, there is a need to develop an air-conditioning filter having antiviral or antibacterial performance to prevent the infectious source (virus or bacteria) from spreading into the air.

DISCLOSURE

Technical Problem

The present application has been made in an effort to solve the above-mentioned problems in the related art, and an object of the present application is to provide a photocatalytic air-conditioning filter module capable of efficiently exhibiting an antiviral or antibacterial function against an infectious source (virus or bacteria) contained in air.

In addition, another object of the present application is to provide a photocatalytic air-conditioning filter module having a structure capable of establishing a middle ground between one-pass performance and air circulation efficiency.

However, technical problems to be solved by the exemplary embodiment of the present application are not limited to the aforementioned technical problem, and other technical problems may be present.

Technical Solution

As a mean for solving the above-mentioned technical problems, a photocatalytic air-conditioning filter module according to an embodiment of the present application includes: a first casing partition wall part having a plurality of lattice-shaped spaces in which photocatalytic balls are positioned; a second casing partition wall part connected to a rear end of the first casing partition wall part and having a plurality of lattice-shaped spaces positioned to be staggered with respect to the lattice-shaped spaces of the first casing partition wall part; the one or more photocatalytic balls accommodated in the lattice-shaped spaces of the first and second casing partition wall parts; a first cover configured to cover a front surface of the first casing partition wall part and prevent the photocatalytic balls from separating from the first casing partition wall part; and a second cover configured to cover a rear surface of the second casing partition wall part and prevent the photocatalytic balls from separating from the second casing partition wall part.

In addition, the one or more photocatalytic balls may be accommodated in one lattice-shaped space, and the photocatalytic ball may have a size that defines an available interval in at least one of horizontal and vertical directions of the lattice-shaped space in a state in which the one or more photocatalytic balls are accommodated in the lattice-shaped space so that the photocatalytic balls move correspondingly to a flow of air in the lattice-shaped space in which the photocatalytic balls are accommodated.

In addition, the first casing partition wall part, the second casing partition wall part, and the photocatalytic ball may be configured such that the first and second photocatalytic balls partially overlap each other when viewed from the front or rear side even though the first photocatalytic ball disposed in the lattice-shaped space of the first casing partition wall part is maximally spaced apart from the second photocatalytic ball disposed in the lattice-shaped space of the second casing partition wall part disposed adjacent to the lattice-shaped space of the first casing partition wall part in a forward/rearward direction while partially overlapping the lattice-shaped space of the first casing partition wall part in a staggered manner.

In addition, the plurality of lattice-shaped spaces of the second casing partition wall part may be positioned to be staggered with respect to the plurality of lattice-shaped spaces of the first casing partition wall part so that no spacing distance is defined in a diagonal direction between the photocatalytic balls accommodated in the plurality of lattice-shaped spaces of the second casing partition wall part and the photocatalytic balls accommodated in the plurality of lattice-shaped spaces of the first casing partition wall part.

In addition, the photocatalytic air-conditioning filter module may be disposed so that air passes sequentially through the first casing partition wall part and the second casing partition wall part from the front side, and the second casing partition wall part may have a hole formed in a lateral side of the lattice-shaped space and configured to communicate with the adjacent lattice-shaped space.

In addition, the first and second casing partition wall parts may each include horizontal and vertical partition walls, one of the horizontal and vertical partition walls may have a first cut-out portion recessed rearward from the front side, the other of the horizontal and vertical partition walls may have a second cut-out portion recessed forward from the rear side and configured to engage with the first cut-out portion, and the horizontal and vertical partition walls may be coupled to each other as the first and second cut-out portions engage with each other.

In addition, the photocatalytic ball may be a ball made of a photocatalyst or a ball made of ceramic or metal and coated with a photocatalyst.

In addition, the photocatalytic air-conditioning filter module according to the embodiment of the present application may include an active light source part configured to emit light toward the first and second casing partition wall parts, and the active light source part is positioned forward of the first casing partition wall part or positioned rearward of the second casing partition wall part in accordance with mechanical behavior properties of air passing through the air-conditioning filter.

In addition, the photocatalytic air-conditioning filter module according to the embodiment of the present application may further include: a guide frame configured to ensure a spacing distance and an air flow path between the active light source part and the first casing partition wall part or the second casing partition wall part; a light reflection plate configured to minimize a leak of light emitted from the active light source part to the outside and maximize photocatalytic activity efficiency; an active light source driver; and a supply line configured to supply power.

In addition, an air purification device according to the embodiment of the present application may include the photocatalytic air-conditioning filter module according to the embodiment of the present application.

A photocatalytic air-conditioning filter module according to another embodiment of the present application includes: a first casing partition wall part having a plurality of lattice-shaped internal spaces densely defined by partition walls so that air flows in the plurality of lattice-shaped internal spaces; and a second casing partition wall part coupled to a rear surface of the first casing partition wall part in a staggered manner and having a plurality of lattice-shaped internal spaces densely defined by partition walls so that air flows in the plurality of lattice-shaped internal spaces, in which the first and second casing partition wall parts are coated with a photocatalyst or made of a photocatalyst.

In addition, the photocatalytic air-conditioning filter module according to another embodiment of the present application may be a one-body type or a module type.

In addition, an air purification device according to another embodiment of the present application may include the photocatalytic air-conditioning filter module according to another embodiment of the present application.

The technical solution is just illustrative but should not be interpreted as being intended to limit the present application. In addition to the above-mentioned exemplary embodiment, additional exemplary embodiments may be present in the drawings and the detailed description of the invention.

Advantageous Effects

According to the technical solution of the present application, the casing partition wall parts including the photocatalyst are disposed in two or more stages and arranged in a staggered manner, such that the contact area between the photocatalyst and the air may significantly increase. Therefore, it is possible to provide the photocatalytic air-conditioning filter module having the structure capable of efficiently exhibiting the antiviral or antibacterial function against the infectious source (virus or bacteria) included in the air and establishing the middle ground between the one-pass performance and the air circulation efficiency.

However, the effects, which can be obtained by the present application, are not limited to the above-mentioned effects, and other effects may be present.

BEST MODE

Figure 1:
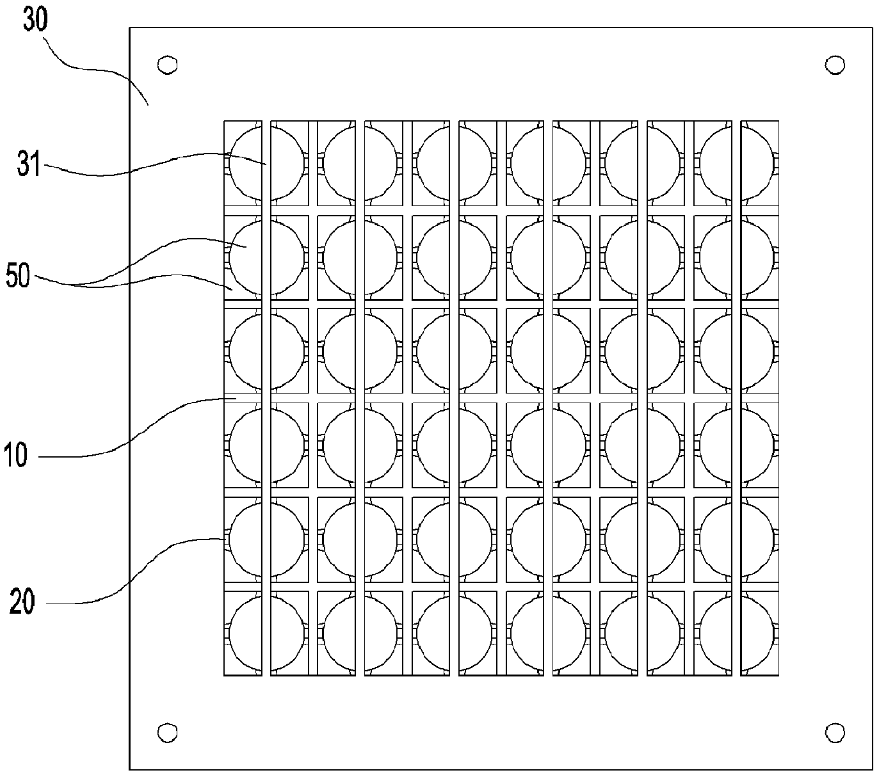
FIG. 1 is a schematic front view of a photocatalytic air-conditioning filter module according to an embodiment of the present application.

Hereinafter, exemplary embodiments of the present application will be described in detail with reference to the accompanying drawings so that those with ordinary skill in the art to which the present application pertains may easily carry out the exemplary embodiments. However, the present application may be implemented in various different ways, and is not limited to the exemplary embodiments described herein. A part irrelevant to the description will be omitted in the drawings in order to clearly describe the present application, and similar constituent elements will be designated by similar reference numerals throughout the specification.

Throughout the specification of the present application, when one constituent element is referred to as being "connected to" another constituent element, one constituent element can be "directly connected to" the other constituent element, and one constituent element can also be "electrically connected to" or "indirectly connected to" the other element with other elements therebetween.

Throughout the specification, when one member is disposed "on", "at an upper side of", "at an upper end of", "below", "at a lower side of", or "at a lower end of" another member in the present specification of the present application, this includes not only a case where one member is brought into contact with another member, but also a case where still another member is present between the two members.

Throughout the specification of the present application, unless explicitly described to the contrary, the word "comprise" or "include" and variations, such as "comprises", "comprising", "includes" or "including", will be understood to imply the inclusion of stated constituent elements, not the exclusion of any other constituent elements.

Throughout the specification of the present application, the front and rear views are defined based on the drawings, and a direction in which the photocatalytic air-conditioning filter module according to the embodiment of the present application is directed is not limited thereto. For example, based on the drawings, the photocatalytic air-conditioning filter module according to the embodiment of the present application may be disposed so that a front surface thereof is directed upward or directed in an oblique direction. In addition, the photocatalytic air-conditioning filter module may be disposed in a target space and directed in various directions in consideration of a direction in which the photocatalytic air-conditioning filter module needs to be disposed.

Hereinafter, for the convenience of description, the photocatalytic air-conditioning filter module according to the embodiment of the present application will be referred to as a filter module.

Figure 2:
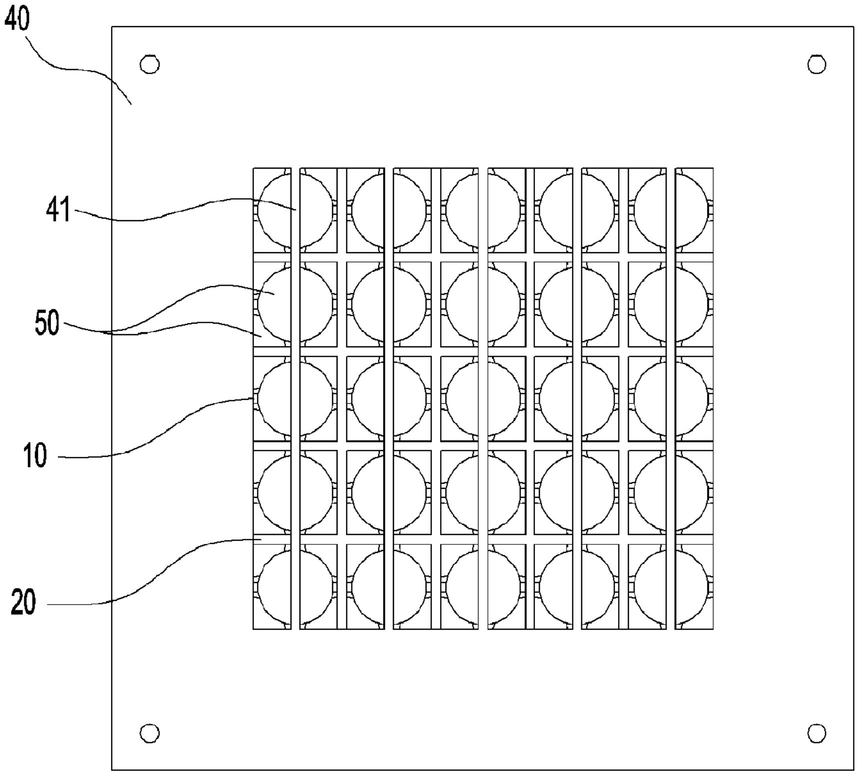
FIG. 2 is a schematic rear view of the photocatalytic air-conditioning filter module according to the embodiment of the present application.
Figure 3:
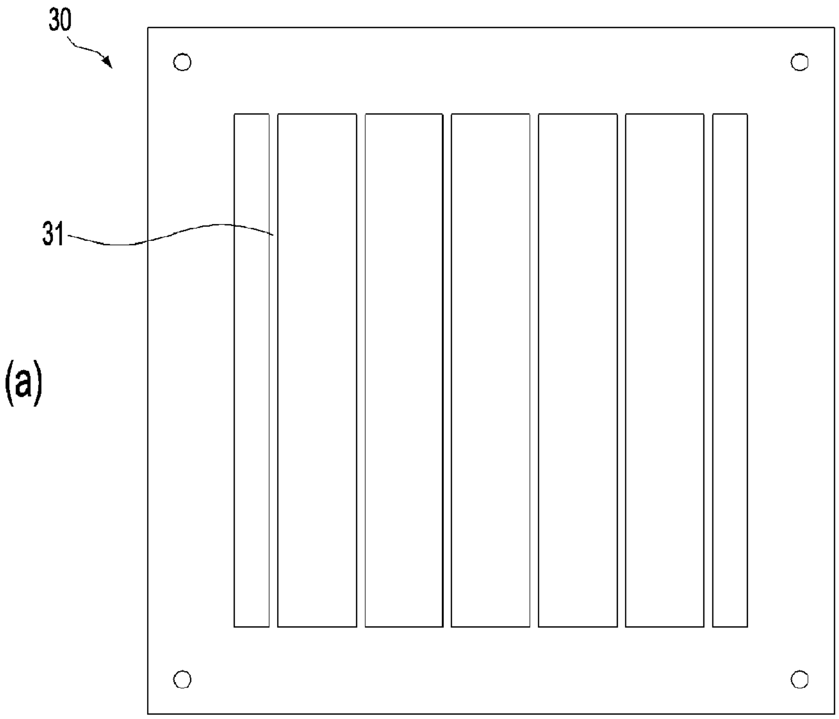
FIG. 3 is a schematic front view for explaining a first cover and a first casing partition wall part of the photocatalytic air-conditioning filter module according to the embodiment of the present application.
Figure 3:
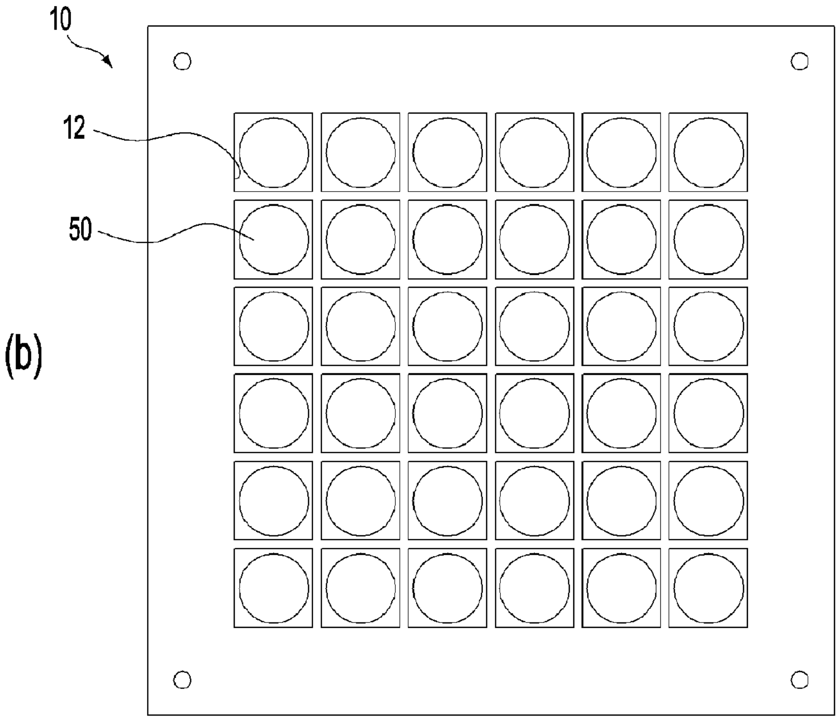
Figure 4:
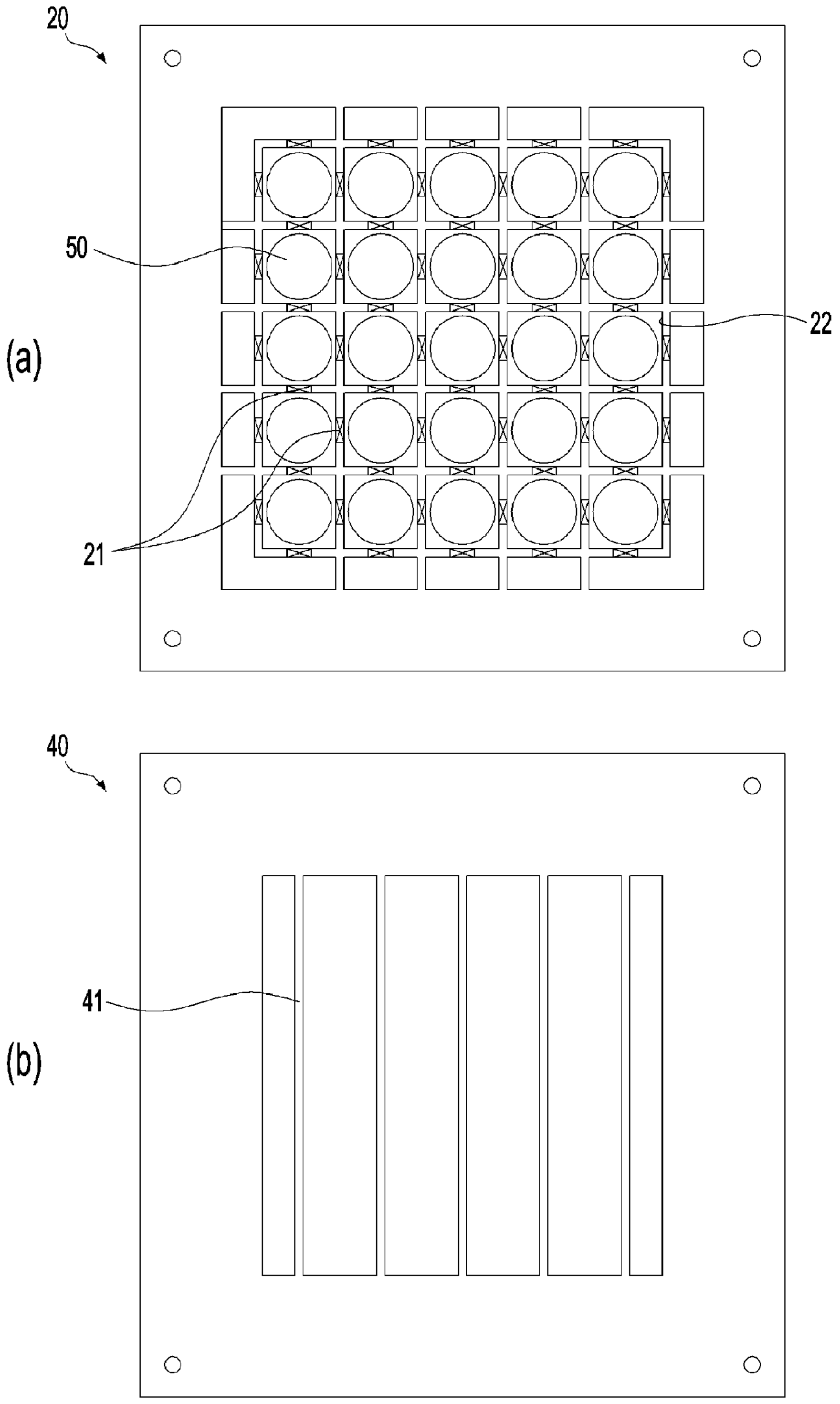
FIG. 4 is a schematic rear view for explaining a second casing partition wall part and a second cover of the photocatalytic air-conditioning filter module according to the embodiment of the present application.
Figure 5:
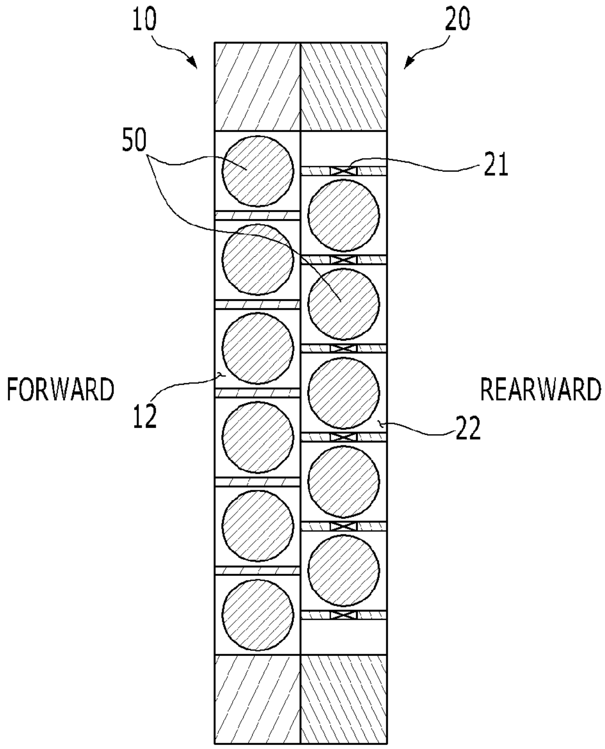
FIG. 5 is a schematic cross-sectional view for explaining a staggered arrangement of the first casing partition wall part and the second casing partition wall part of the photocatalytic air-conditioning filter module according to the embodiment of the present application.

FIG. 1 is a schematic front view of the filter module, and FIG. 2 is a schematic rear view of the filter module. In addition, FIG. 3 is a schematic front view for explaining a first cover 30 and a first casing partition wall part 10 of the filter module, and FIG. 4 is a schematic rear view for explaining a second casing partition wall part 20 and a second cover 40 of the filter module. In addition, FIG. 5 is a schematic cross-sectional view for explaining a staggered arrangement of the first casing partition wall part 10 and the second casing partition wall part 20 of the filter module.

Referring to FIGS. 1 to 5, the filter module includes the first casing partition wall part 10, the second casing partition wall part 20, the first cover 30, and the second cover 40. In addition, the filter module may include an active light source (see FIG. 10 exemplarily).

First, the filter module may be configured such that an active light source for activating a photocatalyst is disposed at one of a front side of the first cover 30 and a rear side of the second cover 40 or both the front side of the first cover 30 and the rear side of the second cover 40 (in other words, disposed at least one side) in a space in which air flows. For example, the filter module may be installed in various spaces where air contaminated by infectious sources (virus and bacteria) flows, and there requires a useful operation such as an operation of an antiviral function and air purification implemented by the photocatalytic activity. The various spaces include an interior (including an air movement passage) of a device for purifying air in spaces such as buildings and transportation means (cars, trains, aircraft, ships, etc.). The filter module includes the active light source, the casing partition wall parts 10 and 20, and the covers 30 and 40 and is installed in the form made in consideration of air purification efficiency and energy consumption efficiency.

In addition, a flow of air passing through the filter module may be implemented by various mechanical devices such as a fan, a circulator, and an air blower. Because the mechanical device, which implements the flow of air, is apparent to those skilled in the art, a more specific description thereof will be omitted. In addition, the filter module is disposed in the target space in which a flow of air is naturally generated, such that the flow of air may be provided without an artificial mechanical device provided in the filter module.

An arrangement direction, an installation position, and the like of the filter module may be appropriately adjusted so that a flow of air may be smoothly generated in lattice-shaped spaces 12 and 22, and an antiviral function may be effectively implemented. For example, a suction fan may be disposed at a rear side of the second casing partition wall part 20 so that air at a front side of the first casing partition wall part 10 may pass through the first casing partition wall part 10 and the second casing partition wall part 20 and flow to the rear side of the second casing partition wall part 20. As a more specific example, the filter module is mounted in an air purification device having an antiviral function. The air purification device may be provided such that the filter module is in a housing, an inlet port, through which air is introduced, is formed in a housing front surface member at a front side of the filter module, the suction fan is installed inside the housing and disposed at a rear side of the filter module, the suction fan sucks air and allows the air to pass through the filter module, a discharge port, through which the air having passed through the filter module is discharged, is formed in a housing upper surface member. In this case, the flow of air in the housing enables the air sucked through an inlet port to completely pass through the filter module. The active light source may be disposed at a position at which the active light source may effectively activate photocatalytic balls 50 to sufficiently implement the antiviral function of the filter module.

Figure 10:
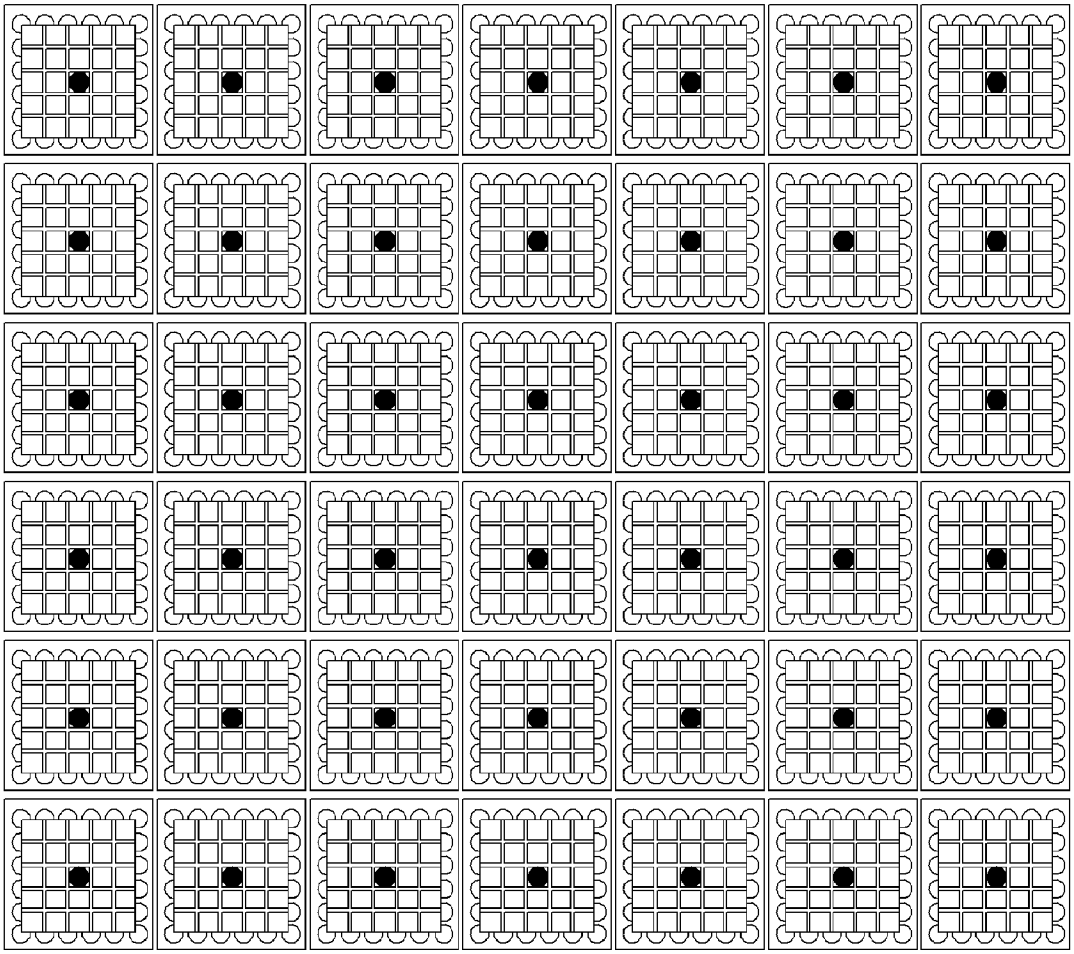
FIG. 10 is a schematic rear view illustrating one embodiment in which active light sources (indicated by black points) of the photocatalytic air-conditioning filter module according to the embodiment of the present application are disposed at rear sides of the second casing partition wall parts.

FIG. 10 is a schematic rear view illustrating one embodiment in which the active light sources (indicated by black points) of the filter module are disposed at rear sides of the second casing partition wall parts.

One or more active light sources may be disposed at one of the rear side of the second casing partition wall part 20 and the front side of the first casing partition wall part 10 or both the rear side of the second casing partition wall part 20 and the front side of the first casing partition wall part 10 (in other words, disposed at least one side) in order to emit light toward the photocatalytic balls 50 disposed in the lattice-shaped spaces 12 and 22. For example, referring to FIG. 10, one active light source may be disposed for each of the filter modules each having the spaces 12 and 22 having a shape of a 5×5 lattice in a one-to-one manner, but the arrangement of the active light source is not limited thereto. The positions of the active light sources and the number of active light sources may be set to more improve activity efficiency of the photocatalytic ball 50 in consideration of a dimension of the filter module. For example, the configuration in which the plurality of active light sources is arranged to irradiate a partial surface of the first casing partition wall part 10 in which the photocatalytic balls 50 are accommodated may be replaced with a configuration in which a single light source is disposed to irradiate the front surface of the first casing partition wall part 10. The active light source may be installed on a light source mounting frame structure (an active light source part may include the active light source and the light source mounting frame structure). For example, the light source mounting frame structure may include a plurality of spacing members disposed at intervals in an upward/downward direction or a transverse direction, and a peripheral member configured to fix two opposite ends of each of the plurality of spacing members. The plurality of active light sources may be installed at intervals in a longitudinal direction of the spacing member with respect to the spacing members. In addition, the interval between the spacing members, a thickness of the spacing member, and the like may be appropriately set in consideration of a flow of air in a forward/rearward direction, structural rigidity of the light source mounting frame structure, and the like.

For example, when the active light source is positioned at the rear side, the light source mounting structure may be disposed to be interposed between the second casing partition wall part 20 and the second cover 40. On the contrary, when the active light source is positioned at the front side, the light source mounting structure may be disposed to be interposed between the first casing partition wall part 10 and the first cover 30. A module shape integrally assembled may be provided by the configuration in which the active light source is disposed inside the cover. As another example, when the active light source is positioned at the rear side, the light source mounting structure may be disposed rearward of the second cover 40. On the contrary, when the active light source is positioned at the front side, the light source mounting structure may be disposed forward of the first cover 30.

For example, referring to FIG. 10, the active light source may be disposed rearward of the second casing partition wall part 20. When the filter module is provided in the form of the air purification device disposed in the housing. The air, which flows from the front side of the first casing partition wall part 10, passes through the second casing partition wall part 20, and flows to the rear side of the first casing partition wall part 10, forms vortices because of a differential pressure without being constant in the air flow direction until the air is discharged through the air discharge port provided at the upper or rear side (rear surface) of the housing. That is, because the vortices are formed by the differential pressure in the rear space of the second casing partition wall part 10 through which the air has passed, the contact surface or contact time for which the photocatalytic balls 50 accommodated in the second casing partition wall part 10 are in contact with the air is increased by the vortices, such that the useful effect implemented by the photocatalytic activity may be more effectively exhibited. Therefore, the active light source may be disposed at the rear side of the second casing partition wall part 20 in consideration of the above-mentioned configuration. However, the arrangement position of the active light source is not necessarily limited thereto. The position of the active light source may be set to a position at which excellent air purification ability and energy consumption reduction are possible.

In addition, the light emitted from the active light source of the filter module to the photocatalytic ball 50 may be the light that may activate the photocatalyst. The properties of light may be set in consideration of the properties of photocatalytic materials included in the photocatalytic ball 50. However, for example, the light may be light having a wavelength in an ultraviolet band. For example, the active light source may emit light having a wavelength that is a wavelength of the ultraviolet ray in a band of 200 nm to 390 nm, but the light is not limited thereto. The light may be set as light including a wavelength with highest photocatalytic activity efficiency. For example, the photocatalytic material included in the photocatalytic ball 50 may contain titanium dioxide. The light emitted from the active light source may be set as the ultraviolet ray in the wavelength range of 360 nm to 380 nm to maximize photocatalytic activity efficiency of titanium dioxide without producing ozone. However, the present application, the photocatalyst is not necessarily limited only to titanium dioxide. The known photocatalyst and various photocatalysts, which will be developed in the future, may be applied to the present application. In addition, a reaction between the light and the photocatalyst is apparent those skilled in the art, a specific description thereof will be omitted.

In addition, the filter module may include: a guide frame configured to ensure a spacing distance and an air flow path between the active light source and the photocatalytic ball 50; a light reflection plate configured to minimize a leak of light emitted from the active light source to the outside and maximize the photocatalytic activity efficiency; an active light source driver; and a power supply line.

For example, the active light source of the filter module may emit light in a wavelength range up to 40 mm in the case of a UV LED having a light emission angle of 120 degrees and a spacing distance of 10 mm. However, the spacing distance between the active light source and the photocatalytic ball 50, the number of active light sources, the interval between the active light sources, and the like may be set in consideration of the light emission angle of the active light source, the light amount deviation, a configuration for improving the photocatalytic activity of the photocatalytic ball 50, and a configuration for ensuring the energy efficiency.

In addition, the light reflection plate may be disposed at a position opposite to or adjacent to the active light source part to reflect the light, which passes through the first and second casing partition wall parts 10 and 20, or the light, which scatters from the casing partition wall parts 10 and 20 toward the active light source part, back to the first and second casing partition wall parts 10 and 20. For example, to reflect the light passing through the first and second casing partition wall parts 10 and 20 back to the partition wall parts 10 and 20 again, the light reflection plate may be positioned forward of the first casing partition wall part 10 when the active light source part is positioned at the rear side, whereas the light reflection plate may be positioned rearward of the second casing partition wall part 20 when the active light source part is positioned at the front side. In addition, to reflect the light, which scatters from the first and second casing partition wall parts 10 and 20 toward the active light source part, back to the casing partition wall part, the light reflection plate may be positioned forward of the active light source part when the active light source part is positioned at the front side, whereas the light reflection plate may be positioned rearward of the active light source part when the active light source part is positioned at the rear side.

One or more active light sources may be disposed at one of the rear side of the second casing partition wall part 20 and the front side of the first casing partition wall part 10 or both the rear side of the second casing partition wall part 20 and the front side of the first casing partition wall part 10 (in other words, disposed at least one side) in order to emit light toward the photocatalytic balls 50 disposed in the lattice-shaped spaces 12 and 22.

In addition, the light reflection plate may have a surface material that may reflect light. In addition, the light reflection plate may have a structure partially opened in the forward/rearward direction to prevent a flow of air from being restricted in the forward/rearward direction. For example, the light reflection plate may have a pattern corresponding to each of the lattice-shaped spaces of the first and second casing partition wall parts 10 and 20. As a more specific example, the light reflection plate may include a reflection pattern portion configured to reflect light reaching the reflection pattern portion, and an opening pattern portion configured to allow air reaching the opening pattern portion to pass through the opening pattern portion. In this case, the reflection pattern portion may have a material, dimension, and shape that may implement reflection angle, reflectance, and the like that may more efficiently reflect the light reaching the reflection pattern portion toward the first and second casing partition wall parts 10 and 20.

For example, to reflect the light passing through the first and second casing partition wall parts 10 and 20 back to the casing partition wall parts 10 and 20, the light reflection plate may be interposed between the second casing partition wall part 20 and the second cover 40 or disposed rearward of the second cover 40 when the active light source part is positioned at the front side, whereas the light reflection plate may be interposed between the first casing partition wall part 10 and the first cover 30 or disposed forward of the first cover 30 when the active light source part is positioned at the rear side. As another example, to reflect the light, which scatters from the first and second casing partition wall parts 10 and 20 toward the active light source part, back to the casing partition wall part 10 and 20, the light reflection plate may be interposed and disposed forward of the active light source part when the active light source part is positioned at the front side, whereas the light reflection plate may be interposed and disposed rearward of the active light source part when the active light source part is positioned at the rear side. When the light reflection plate is disposed inside the cover, the light reflection plate, the cover, the casing partition wall part may be provided in the form of a module integrally assembled. When the light reflection plate is disposed forward or rearward of the active light source part, the light reflection plate and the active light source part (including the active light source and the light source mounting frame structure) may be provided in the form of a module integrally assembled.

Because the active light source driver and the power supply line are apparent to those skilled in the art, a specific description thereof will be omitted.

Meanwhile, referring to FIGS. 1 to 5, the photocatalytic balls 50 may be accommodated in the lattice-shaped spaces 12 and 22 of the first and second casing partition wall parts 10 and 20 of the filter module (accommodated in the partition wall internal spaces defined by the partition walls positioned at the upper, lower, left, and right sides). In addition, the photocatalytic ball 50 may be a ball made of a material containing a photocatalytic material or a ball made of another material (e.g., ceramic or metal) and having a ball shape coated with the photocatalyst. In the case of the ball coated with the photocatalyst, it is possible to apply the coating methods known in the related art or various coating methods that will be developed in the future.

In addition, a diameter of the photocatalytic ball 50 may be adjusted. For example, to improve the air purification performance by improving the air circulation efficiency, a size (diameter) of the photocatalytic ball 50 may be smaller than a size (width or height) of an interior of each of the lattice-shaped spaces 12 and 22 of the partition wall part to be described below, thereby inducing a smoother flow of air. That is, to allow the photocatalytic balls 50 to move correspondingly to the flow of air in the lattice-shaped spaces 12 and 22 in which the photocatalytic balls 50 accommodated, the photocatalytic ball 50 may be smaller in size than the lattice-shaped space 12 of the first casing partition wall part 10 or the lattice-shaped space 22 of the second casing partition wall part 20, such that the flow of air may become smoother as the photocatalytic balls 50 move. In contrast, to improve the air purification performance by improving one-pass performance, a size (diameter) of the photocatalytic ball 50 may be set to be similar to the size of the interior of each of the partition wall part lattice-shaped spaces 12 and 22 to be described below, such that the photocatalytic balls 50 may be densely provided, thereby allowing the flowing air to maximally come into contact with the surfaces of the photocatalytic balls 50.

In addition, one or more photocatalytic balls 50 may be accommodated in one of the lattice-shaped spaces 12 and 22, and the photocatalytic ball 50 may have a size that may define an available space in at least one of the horizontal and vertical directions of the lattice-shaped spaces 12 and 22 in the state in which the one or more photocatalytic balls 50 are accommodated in one of the lattice-shaped spaces 12 and 22 so that the photocatalytic balls 50 may move correspondingly to the flow of air in the lattice-shaped spaces 12 and 22 in which the photocatalytic balls 50 are accommodated.

For example, in a case in which one photocatalytic ball 50 is accommodated in one lattice-shaped space 12 or 22 as the photocatalytic balls 50 and the lattice-shaped spaces 12 and 22 correspond to one another in a one-to-one manner, the photocatalytic ball 50 may be smaller in size than the lattice-shaped space 12 of the first casing partition wall part 10 or the lattice-shaped space 22 of the second casing partition wall part 20 so that one photocatalytic ball 50 may be accommodated in one lattice-shaped space 12 or 22, and the photocatalytic ball 50 may move correspondingly to the flow of air in the lattice-shaped space 12 or 22 in which the photocatalytic ball 50 is accommodated. In this case, the first and second covers 30 and 40 may allow air to pass therethrough while preventing the separation of the photocatalytic ball 50.

In addition, in a case in which a plurality of (N) photocatalytic balls 50 is accommodated in one lattice-shaped space 12 or 22 as the photocatalytic balls 50 and the lattice-shaped spaces 12 and 22 correspond to one another in a many-to-one manner, the photocatalytic ball 50 may have a size that may define an available interval in at least one of the horizontal and vertical directions of the lattice-shaped spaces 12 and 22 in the state in which the plurality of photocatalytic balls 50 is accommodated in one lattice-shaped space 12 or 22 so that the photocatalytic balls 50 may move correspondingly to the flow of air in the lattice-shaped spaces 12 and 22 in the state in which the plurality of photocatalytic balls 50 is accommodated in one lattice-shaped space 12 or 22. In this case, the first and second covers 30 and 40 may allow air to pass therethrough while preventing the separation of the photocatalytic ball 50.

In addition, the photocatalytic ball 50 may have a uniform (constant) diameter. For example, a size (width or height) of the interior of each of the lattice-shaped spaces 12 and 22 may be 4.5 mm, and a diameter of the photocatalytic ball 50 may be about 4 mm. However, the sizes are not necessarily limited thereto. The sizes may be set in consideration of a magnitude of a differential pressure, an air purification ability, energy consumption efficiency, and the like.

As described above, the present application may adjust the air circulation efficiency or the one-pass performance by adjusting the size (width or height) of the interior of each of the lattice-shaped spaces 12 and 22 of the partition wall part. That is, a size (width or height) of the lattice-shaped space 12 of the first casing partition wall part 10 or a size (width or height) of the lattice-shaped space 22 of the second casing partition wall part 20 is larger than a diameter of the photocatalytic ball 50 (e.g., the size (width or height) of the interior of each of the lattice-shaped spaces 12 and 22 is 14 mm, and the diameter of the photocatalytic ball 50 is about 10 mm), such that the flow of air may become smoother, and the photocatalytic balls 50 may maximally come into contact with the air containing infectious sources (virus or bacteria) (the air purification performance is improved by improving the air circulation efficiency). On the contrary, a size (width or height) of the lattice-shaped space 12 of the first casing partition wall part 10 or a size (width or height) of the lattice-shaped space 22 of the second casing partition wall part 20 is similar to a size (diameter) of the photocatalytic ball 50 (e.g., the size (width or height) of the interior of each of the lattice-shaped spaces 12 and 22 is 4.5 mm, and the diameter of the photocatalytic ball 50 is about 4 mm), such that the photocatalytic balls 50 may maximally come into contact with infectious sources (virus or bacteria) contained in the flowing air (the air purification performance is improved by improving the one-pass performance).

In addition, the spacing distance between the photocatalytic ball 50 and the partition wall to be described below may be set in consideration of a size of a differential pressure, an air purification ability, energy consumption efficiency, and the like according to the flow of air.

Meanwhile, the first casing partition wall part 10 is configured such that the plurality of spaces (lattice-shaped spaces) 12, in which the photocatalytic balls 50 may be positioned, is provided in a lattice shape. For example, the first casing partition wall part 10 may be provided in the form of an insect screen (mesh or lattice). The first casing partition wall part 10 may have a thickness in the forward/rearward direction that may allow the first casing partition wall part 10 to accommodate the photocatalytic balls 50. Referring to FIG. 5, the first casing partition wall part 10 may be disposed relatively forward of the second casing partition wall part 20.

In addition, referring to FIGS. 1 and 3, the first casing partition wall part 10 may be disposed rearward of the first cover 30. For example, the first casing partition wall part 10 may be coupled (connected) to the first cover 30 by fastening means such as screw-coupling. However, the method of fastening the first casing partition wall part 10 and the first cover 30 disposed forward of the first casing partition wall part 10 is not limited to the screw-coupling. Various known fastening methods may be applied. For example, the first casing partition wall part 10 may be provided in a shape having a rectangular contour when viewed from the front side. In addition, the lattice-shaped space 12 formed in the first casing partition wall part 10 to accommodate the photocatalytic ball 50 may be provided in a space having a rectangular contour when viewed from the front side. However, the shape and dimension of the first casing partition wall part 10 and the shape and dimension of the lattice-shaped space 12 formed in the first casing partition wall part 10 are not limited thereto.

In addition, for example, a material of the first casing partition wall part 10 may be, but not limited only to, a material including metal, acrylic, ceramic, plastic (PVC, PC, PE, ABS, etc.), a EGI steel sheet, and the like. The material of the first casing partition wall part 10 may be determined in consideration of noise, vibration, and a movement of the photocatalytic ball 50 in the lattice-shaped space 12.

In addition, the first casing partition wall part 10 may be coated with the photocatalyst or made of the photocatalyst. That is, the first casing partition wall part 10 may perform a target function implemented by the photocatalytic activity, independently of (separately from) the photocatalytic ball 50. The coating or manufacturing method using the photocatalyst material may be implemented as various photocatalyst coating or manufacturing methods that may be understood by those skilled in the art.

Examples of the method of manufacturing the first casing partition wall part 10 may include, but not limited only to, injection molding, press molding, laser cutting, water jetting, and the like.

Figure 13:
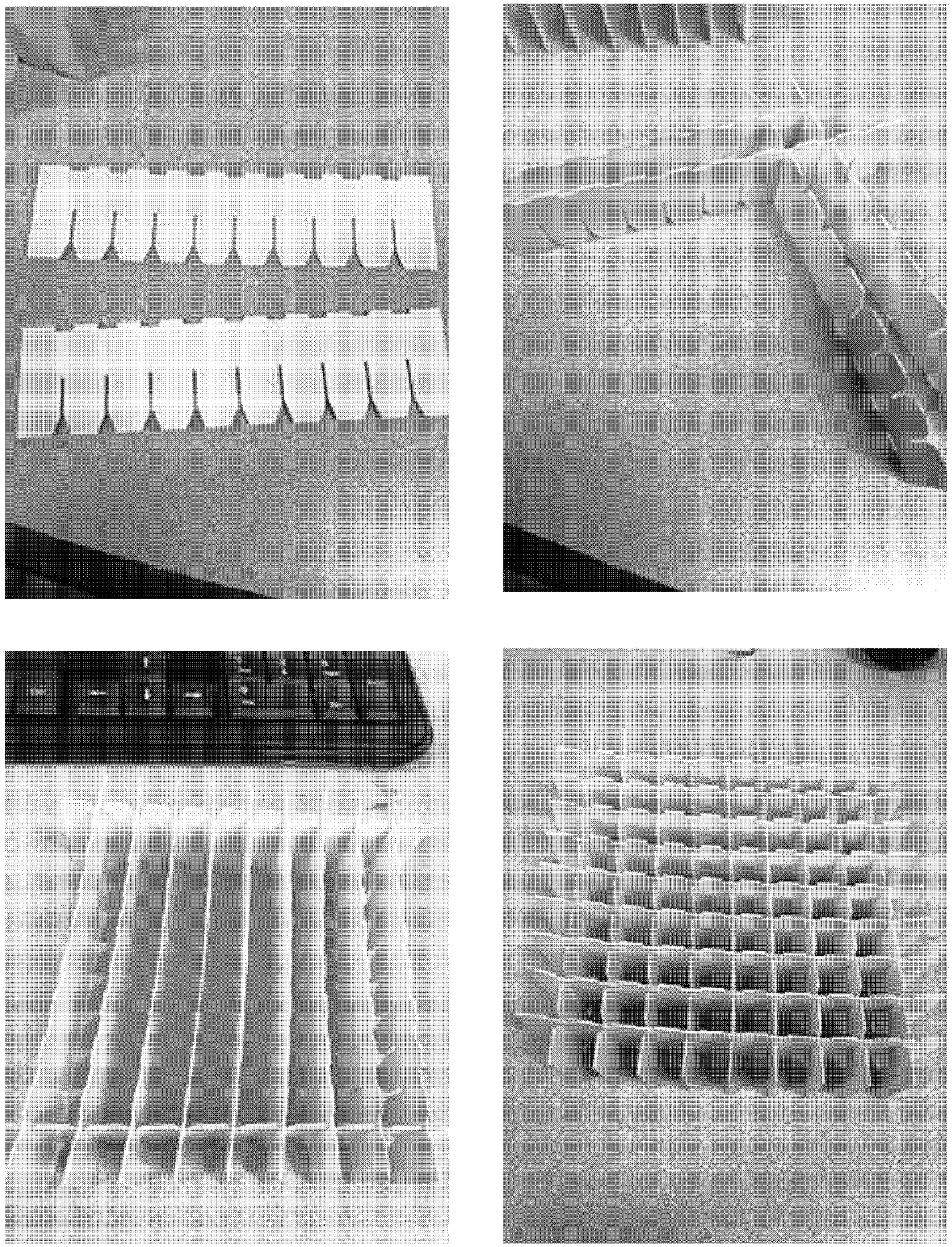
FIG. 13 is a view for exemplarily explaining a method of manufacturing the first casing partition wall part or the second casing partition wall part of the photocatalytic air-conditioning filter module according to the embodiment of the present application.
Figure 14:
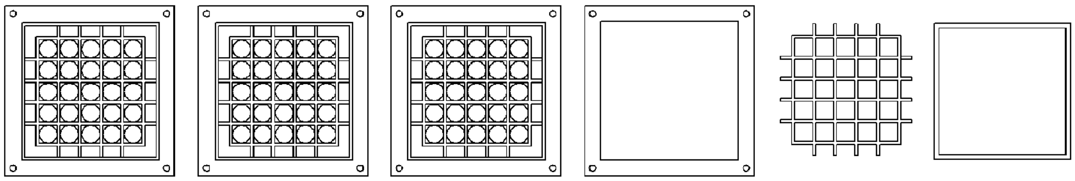
FIG. 14 is a view for explaining a one-body type embodiment (the leftmost view) and a module type embodiment (the remaining views) of the second casing partition wall part of the photocatalytic air-conditioning filter module according to the embodiment of the present application.

For reference, FIG. 13 is a view for explaining an example of the method of manufacturing the first or second casing partition wall parts 10 or 20 of the filter module. Referring to FIG. 13, the partition walls of the first casing partition wall part 10 include a horizontal partition wall and a vertical partition wall. The horizontal and vertical partition walls may be separately manufactured, and cut-out portions, which are cut out in the forward/rearward direction, may be respectively formed in the horizontal and vertical partition walls, such that the horizontal and vertical partition walls may be coupled to each other by coupling the cut-out portions by fitting. For example, any one of the horizontal and vertical partition walls may have the cut-out portion recessed rearward from the front side, and the other of the horizontal and vertical partition walls may have the cut-out portion recessed forward from the rear side, such that the horizontal and vertical partition walls may be coupled to each other in the state in which the cut-out portions face each other.

As described above, the first and second casing partition wall parts 10 and 20 may each include the horizontal partition wall and the vertical partition wall. In addition, referring to FIG. 13, one of the horizontal and vertical partition walls may have first cut-out portions recessed rearward from the front side, and the other of the horizontal and vertical partition walls may have second cut-out portions that are recessed forward from the rear side and engage with the first cut-out portions. The horizontal and vertical partition walls may be coupled to each other as the first and second cut-out portions engage with one another. Specifically, the first and second cut-out portions may be coupled to each other as a rear end of the first cut-out portion (the deepest recessed portion of the first cut-out portion) and a front end of the second cut-out portion (the deepest recessed portion of the second cut-out portion) engage with each other.

A thickness of the partition wall may be about 0.1 mm to 1.2 mm, more particularly, 0.5 mm to 1.0 mm. When the partition wall is too thick, the differential pressure, and the amount of flow of air decreases, which is not advantageous. When the partition wall is too thin, it is difficult to obtain rigidity that may maintain the shape. However, the dimensions are not limited thereto and may be determined in consideration of a material, an air purification ability, costs and the like.

Meanwhile, the first cover 30 may be disposed at the front side of the first casing partition wall part 10 and serve to cover the front surface of the first casing partition wall part 10 and prevent the photocatalytic balls 50 accommodated in the lattice-shaped spaces 12 of the first casing partition wall part 10 from separating from the lattice-shaped spaces 12. Referring to FIG. 3, the first cover 30 may include ball separation prevention members 31 extending across middle portions (centers) of the lattice-shaped spaces 12 of the first casing partition wall part 10. For example, the plurality of ball separation prevention members 31 may be a plurality of members extending in the vertical direction and disposed at intervals in the horizontal direction. However, the present application is not limited thereto. As another example, the ball separation prevention member 31 may be a member extending in the horizontal direction or a member provided in the form of a mesh extending in the horizontal and vertical directions. In addition, the arrangement interval between the ball separation prevention members 31 may be set to an interval in consideration of the size (diameter) of the photocatalytic ball 50 so that the photocatalytic ball 50 may be prevented from separating. For example, in a case in which a size of the photocatalytic ball 50 is significantly smaller than a size of the interior of the lattice-shaped space 12, a plurality of ball separation prevention members 31 may be disposed in one lattice-shaped space 12 while traversing the lattice-shaped space 12. In addition, the plurality of photocatalytic balls 50 each having a small diameter may be inserted into one lattice-shaped space 12, and the cover provided in the form of a mesh may cover and fix the plurality of photocatalytic balls 50.

In addition, as described above, the cover may be coupled to the first casing partition wall part 10 by fastening means such as screw-coupling. For example, the fastening means may include a long screw that may connect the first cover 30, the first casing partition wall part 10, the second casing partition wall part 20, and the second cover 40 altogether. However, the present application is not limited thereto. Various types of fastening means, which are publicly-known to the related art or will be developed in the future, may be applied as the fastening means. Various types of fastening means may, of course, be applied as the fastening means to be described below.

Meanwhile, the second casing partition wall part 20 is coupled to a rear end of the first casing partition wall part 10, and the plurality of lattice-shaped spaces 22 is positioned to be staggered with respect to the lattice-shaped spaces 12 of the first casing partition wall part 10. The first and second casing partition wall parts 10 and 20 may be made of the same or similar material, manufactured by the same or similar manufacturing method, and connected to the neighboring components (the first casing partition wall part 10 and the second cover 40) by the same or similar fastening means. Therefore, the description will be focused on differences from the first casing partition wall part 10, and a detailed description of the contents, which may be understood with reference to the contents and drawings already described regarding the first casing partition wall part 10, will be omitted.

Figure 6:
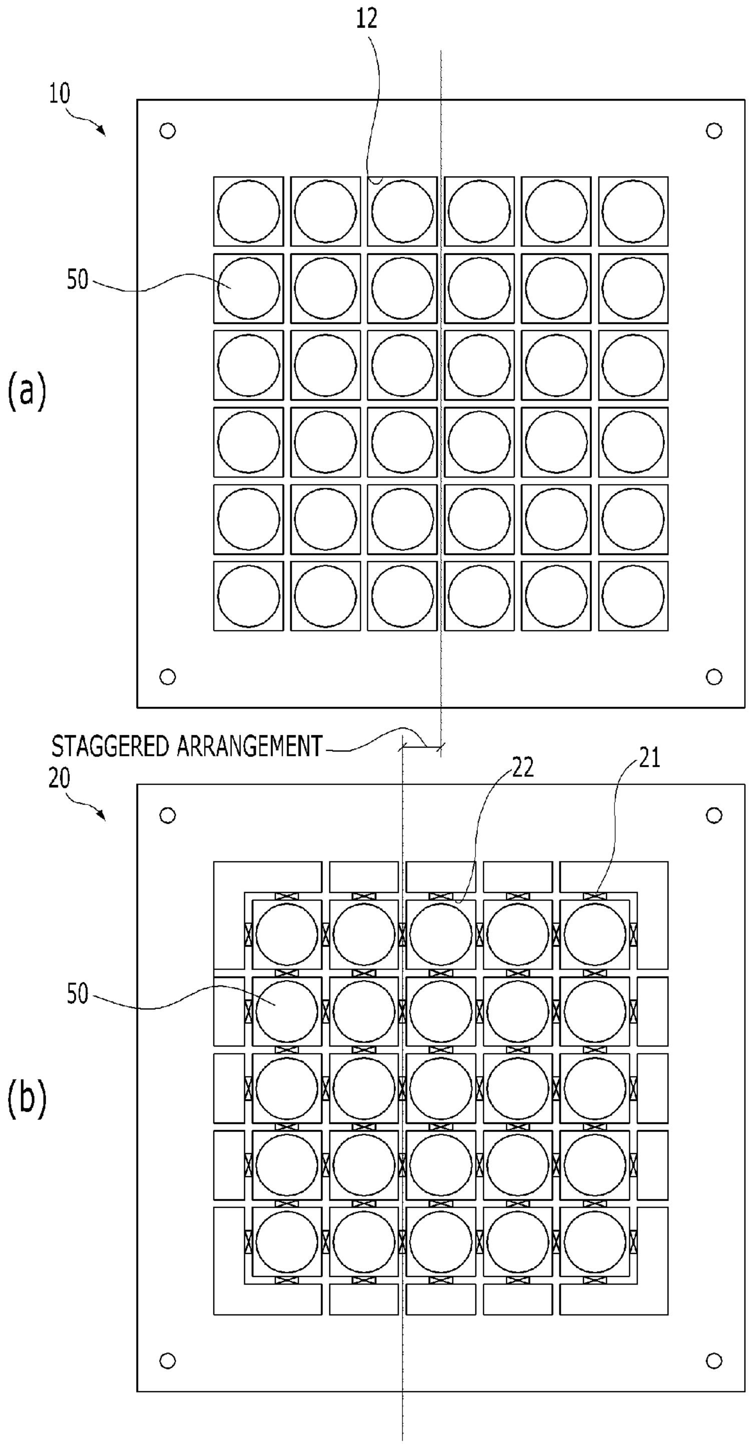
FIG. 6 is a schematic front view for explaining the staggered arrangement of the first casing partition wall part and the second casing partition wall part of the photocatalytic air-conditioning filter module according to the embodiment of the present application.
Figure 7:
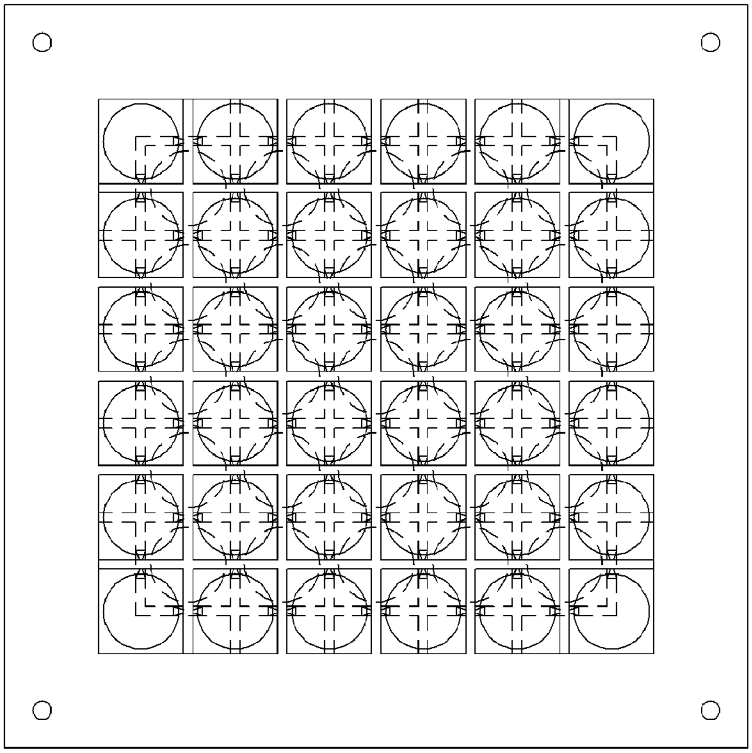
FIG. 7 is a conceptual view for explaining the staggered arrangement of the first casing partition wall part and the second casing partition wall part of the photocatalytic air-conditioning filter module according to the embodiment of the present application.

FIG. 6 is a schematic front view for explaining a staggered arrangement of the first and second casing partition wall parts 10 and 20 of the filter module, and FIG. 7 is a conceptual view for explaining the staggered arrangement of the first and second casing partition wall parts 10 and 20 of the filter module.

Referring to FIGS. 5 to 7, the second casing partition wall part 20 may be stacked on the first casing partition wall part 10 in the forward/rearward direction and disposed at the rear side of the first casing partition wall part 10 while overlapping the first casing partition wall part 10 in a staggered manner. This staggered overlapping arrangement is to further increase the contact area in which the air passing through the filter module comes into contact with the photocatalytic balls 50 in consideration of the flow of air passing over the surfaces of the photocatalytic balls 50 accommodated in the first casing partition wall part 10 and the surfaces of the photocatalytic balls 50 accommodated in the second casing partition wall part 20. Therefore, when the first and second casing partition wall parts are stacked while overlapping each other in a staggered manner, a degree to which the first and second casing partition wall parts overlap each other in a staggered manner may be set in consideration of a degree of a differential pressure at the rear side made by the flow of air passing through the filter module, an air purification ability made by a photocatalytic activity reaction, energy consumption efficiency, and the like.

More specifically, referring to FIGS. 5 to 7 (mainly FIG. 6) together, the staggered arrangement of the first and second casing partition wall parts 10 and 20 means that the partition walls of the first and second casing partition wall parts 10 and 20 are disposed in a staggered manner (spaced apart from one another in the transverse direction) without being coincident with one another so that the partition wall of the first casing partition wall part 10 traverses a middle portion of the lattice-shaped space 22 of the second casing partition wall part 20, and the partition wall of the second casing partition wall part 20 traverses a middle portion of the lattice-shaped space 12 of the first casing partition wall part 10 when viewed from the front side (front surface) or the rear side (rear surface). This configuration may be clearly understood from the contents illustrated in FIGS. 5 to 7.

Figure 8:
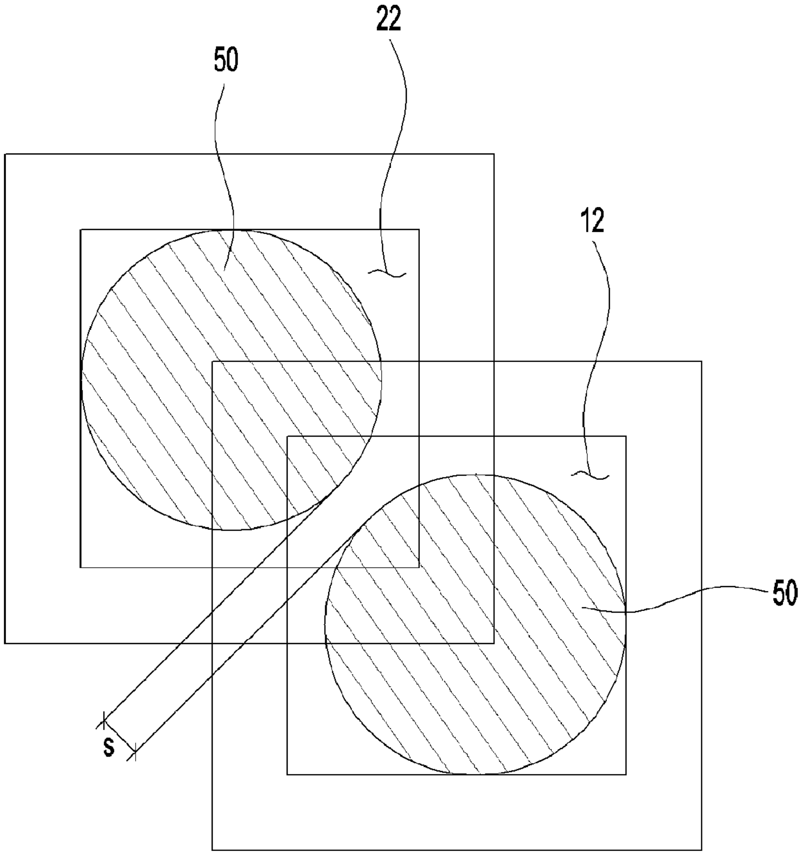
FIG. 8 is a conceptual view for explaining a degree to which an interval (space) is defined between a photocatalytic ball accommodated in the first casing partition wall part and a photocatalytic ball accommodated in the second casing partition wall part or for explaining a degree to which the two photocatalytic balls overlap each other, when viewed from the front side, in accordance with setting such as sizes of the photocatalytic balls, sizes of lattice spaces, and thicknesses of partition walls when the first casing partition wall part and the second casing partition wall part of the photocatalytic air-conditioning filter module according to the embodiment of the present application are disposed in a staggered manner.
Figure 9:
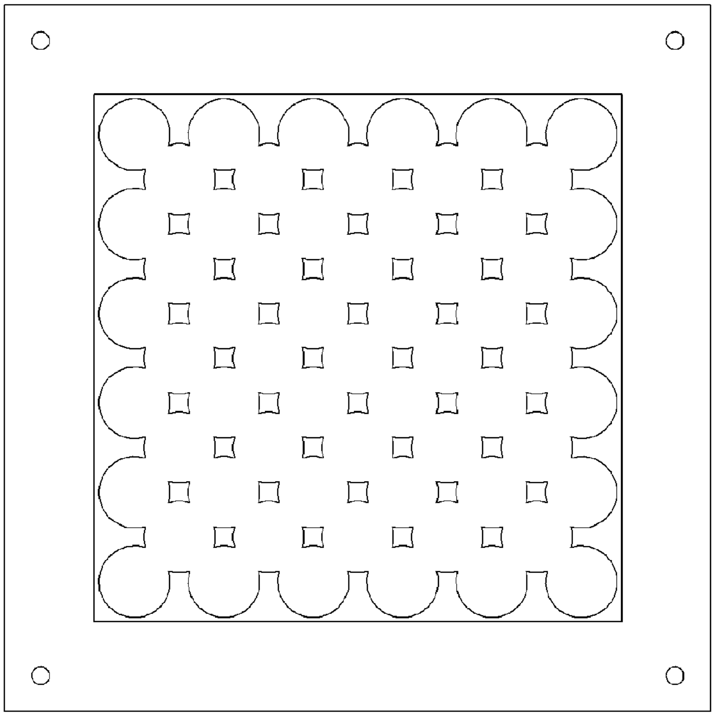
FIG. 9 is a view illustrating an example of design for considering an arrangement area in which the photocatalytic balls are disposed.
Figure 9:
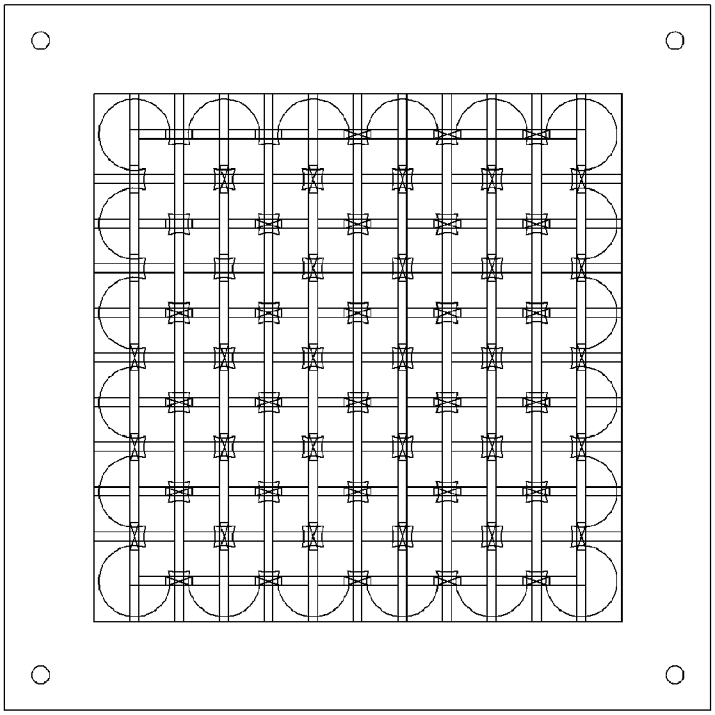

FIG. 8 is a conceptual view for explaining a degree to which an interval (space) is defined between the photocatalytic ball 50 accommodated in the first casing partition wall part 10 and the photocatalytic ball 50 accommodated in the second casing partition wall part 20 or for explaining a degree to which the two photocatalytic balls 50 overlap each other, when viewed from the front side, in accordance with setting such as sizes of the photocatalytic balls 50, sizes of the lattice spaces, and thicknesses of partition walls when the first and second casing partition wall parts 10 and 20 of the filter module are arranged in a staggered manner. In addition, FIG. 9 is a view illustrating an example of design for considering an arrangement area in which the photocatalytic balls 50 are disposed. For example, referring to FIG. 8, to purify air while improving the one-pass performance, the photocatalytic balls 50 each having a diameter of 4 mm are accommodated in the lattice-shaped spaces 12 and 22 disposed at intervals of 4.5 mm, and the lattice-shaped spaces 12 and 22 are disposed in a staggered manner as described above. In this case, a maximum spacing distance (s) between the photocatalytic ball 50 of the first casing partition wall part 10 and the photocatalytic ball 50 of the second casing partition wall part 20 adjacent to the photocatalytic ball 50 of the first casing partition wall part 10, when viewed from the front side, may be 0.2426 mm (referring to FIG. 8, the maximum spacing distance refers to a spacing distance in a state in which the photocatalytic balls 50 are maximally in close contact with one another toward the left upper side or the right lower side in the lattice-shaped spaces 12 and 22). In the case in which the partition walls are disposed at the spacing interval of 4.5 mm to accommodate the photocatalytic balls 50 each having the diameter of 4 mm as described above, the air passing through a separation space (the spacing distance (s)) of 0.2426 mm may pass through the separation space without coming into contact with the photocatalytic ball 50 even though the photocatalytic balls 50 are disposed in two stages. Therefore, the optimal spacing distance between the photocatalytic balls 50, which is set in consideration of a flow rate of air and a level of contact between air and the photocatalytic ball 50, may be set through experiments, simulations, and the like (see FIG. 9).

Therefore, the first casing partition wall part 10, the second casing partition wall part 20, and the photocatalytic ball 50 may be configured such that the first photocatalytic ball 50 and the second photocatalytic ball 50 partially overlap each other when viewed from the front or rear side even though the first photocatalytic ball 50 disposed in the lattice-shaped space 12 of the first casing partition wall part 10 is maximally spaced apart from the second photocatalytic ball 50 disposed in the lattice-shaped space 22 of the second casing partition wall part 20 disposed adjacent to the lattice-shaped space 12 of the first casing partition wall part 10 in the forward/rearward direction while partially overlapping the lattice-shaped space 12 of the first casing partition wall part 10 in a staggered manner.

For example, the first casing partition wall part 10, the second casing partition wall part 20, and the photocatalytic ball 50 may be configured such that the first and second photocatalytic balls 50 partially overlap one another, in other words, no spacing distance (s) is defined between the first and second photocatalytic balls 50 when viewed from the front or rear side even though a center of one or more of the first and second photocatalytic balls 50 does not coincide with a center of each of the lattice-shaped spaces 12 and 22 in which the first and second photocatalytic balls 50 are accommodated. Therefore, there is a low likelihood that air passes over the photocatalytic ball 50 without coming into contact with the photocatalytic ball 50.

In addition, the plurality of lattice-shaped spaces 22 of the second casing partition wall part 20 may be positioned to be staggered with respect to the plurality of lattice-shaped spaces 12 of the first casing partition wall part 10 so that no spacing distance is defined in a diagonal direction between the photocatalytic balls (second photocatalytic balls) 50 accommodated in the plurality of lattice-shaped spaces 22 of the second casing partition wall part 20 and the photocatalytic balls (first photocatalytic balls) 50 accommodated in the plurality of lattice-shaped spaces 12 of the first casing partition wall part 10. In other words, the first casing partition wall part 10, the second casing partition wall part 20, and the photocatalytic ball 50 may be configured such that no spacing distance (s) is defined in the diagonal direction between the first and second photocatalytic balls 50.

For reference, referring to FIG. 8, the configuration in which the first and second photocatalytic balls are spaced apart from each other in the diagonal direction may mean that the first photocatalytic ball 50 disposed in the lattice-shaped space 12 of the first casing partition wall part 10 is maximally spaced apart from the second photocatalytic ball 50 disposed in the lattice-shaped space 22 of the second casing partition wall part 20 in the case in which the lattice-shaped space 12 of the first casing partition wall part 10 and the lattice-shaped space 22 of the second casing partition wall part 20 are disposed in a staggered manner in the horizontal and vertical directions.

In the case of the filter module, the selection of materials and the component modularization need to be performed in consideration of the filter performance, mass-production, and the like. In particular, the filter module needs to be manufactured in consideration of a degree of occurrence of differential pressure, air purification efficiency (one-pass, air circulation, etc.), energy consumption efficiency, and the like.

In addition, referring to FIGS. 4A, 5, and 6B, the second casing partition wall part 20 may have holes 21 formed by hole processing in at least one of the upper, lower, left, and right partition walls that define the lattice-shaped spaces 22, and air flows through the holes 21 and the lattice-shaped spaces 22 adjacent to the holes 21. Therefore, the air, which is introduced from the front side and passes through the lattice-shaped spaces 12 and 22 of the filter module casing partition wall parts 10 and 20, may form vortices in the space closed except for an air outlet port at the rear side thereof Therefore, air may rotate at the rear side of the second casing partition wall part 20. Therefore, the holes 21 may be formed in the partition walls that define the lattice-shaped space 22 of the second casing partition wall part 20 to allow the air to flow more smoothly by the occurrence of the vortex at the rear side. The air flowing to the particular lattice-shaped space 22 may flow back to the adjacent lattice-shaped space 22 through the hole 21, which makes it possible to reduce the differential pressure and increase the contact area between air and the photocatalytic ball 50. One or more holes 21 may be formed in one partition wall in consideration of the air flow efficiency.

Meanwhile, referring to FIGS. 2 and 4, the second cover 40 serves to cover the rear surface of the second casing partition wall part 20 and prevent the photocatalytic balls 50 accommodated in the lattice-shaped spaces 22 of the second casing partition wall part 20 from separating from the lattice-shaped spaces 22. The second cover 40 may be understood as being identical or similar to the first cover 30 with reference to the drawings. Therefore, a repeated description of the ball separation prevention member 41, the fastening means, and the like will be omitted.

Figure 11:
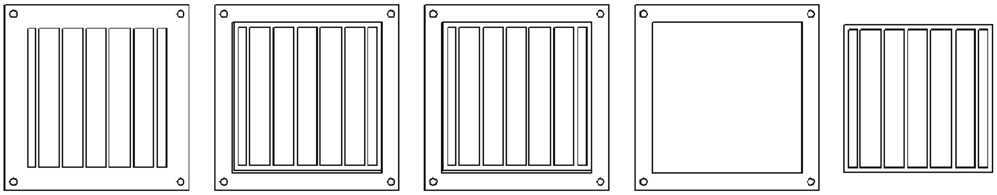
FIG. 11 is a view for explaining a one-body type embodiment (the leftmost view) and a module type embodiment (the remaining views) of the first cover of the photocatalytic air-conditioning filter module according to the embodiment of the present application.
Figure 12:
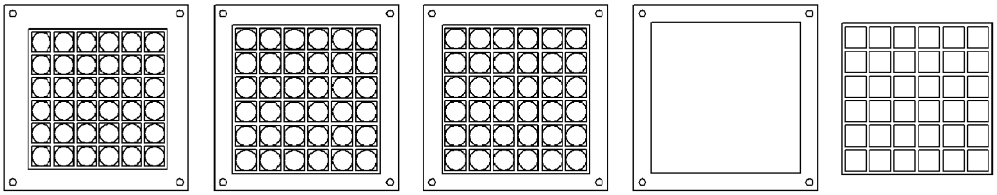
FIG. 12 is a view for explaining a one-body type embodiment (the leftmost view) and a module type embodiment (the remaining views) of the first casing partition wall part of the photocatalytic air-conditioning filter module according to the embodiment of the present application.

Meanwhile, FIG. 11 is a view for explaining a one-body type embodiment (the leftmost view) and a module type embodiment (the remaining views) of the first cover of the photocatalytic air-conditioning filter module according to the embodiment of the present application, and FIG. 12 is a view for explaining a one-body type embodiment (the leftmost view) and a module type embodiment (the remaining views) of the first casing partition wall part of the photocatalytic air-conditioning filter module according to the embodiment of the present application. In addition, FIG.

Figure 15:
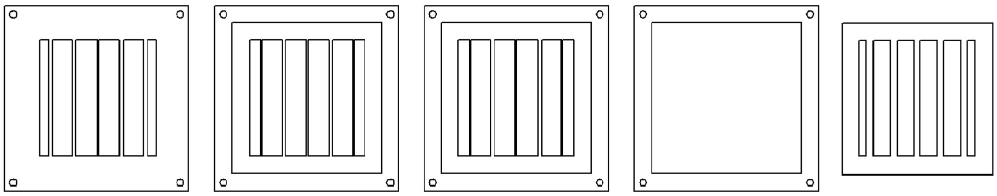
FIG. 15 is a view for explaining a one-body type embodiment (the leftmost view) and a module type embodiment (the remaining views) of the second cover of the photocatalytic air-conditioning filter module according to the embodiment of the present application.

14 is a view for explaining a one-body type embodiment (the leftmost view) and a module type embodiment (the remaining views) of the second casing partition wall part of the photocatalytic air-conditioning filter module according to the embodiment of the present application, and FIG. 15 is a view for explaining a one-body type embodiment (the leftmost view) and a module type embodiment (the remaining views) of the second cover of the photocatalytic air-conditioning filter module according to the embodiment of the present application.

Referring to FIGS. 11, 12, 14, and 15, the first cover 30, the first casing partition wall part 10, the second casing partition wall part 20, and the second cover 40 of the filter module may be manufactured as a one-body type or manufactured as a module type in which low-level components, which constitute the component, are separable. In other words, while the filter module may be provided as a one-body type, the filter module may be modularized as a module type to ensure the ease of manufacturing and maintenance of the module. The type of module may be determined in consideration of the condition to which the filter module is applied.

In addition, the present application may provide an air purification device including the filter module.

Figure 16:
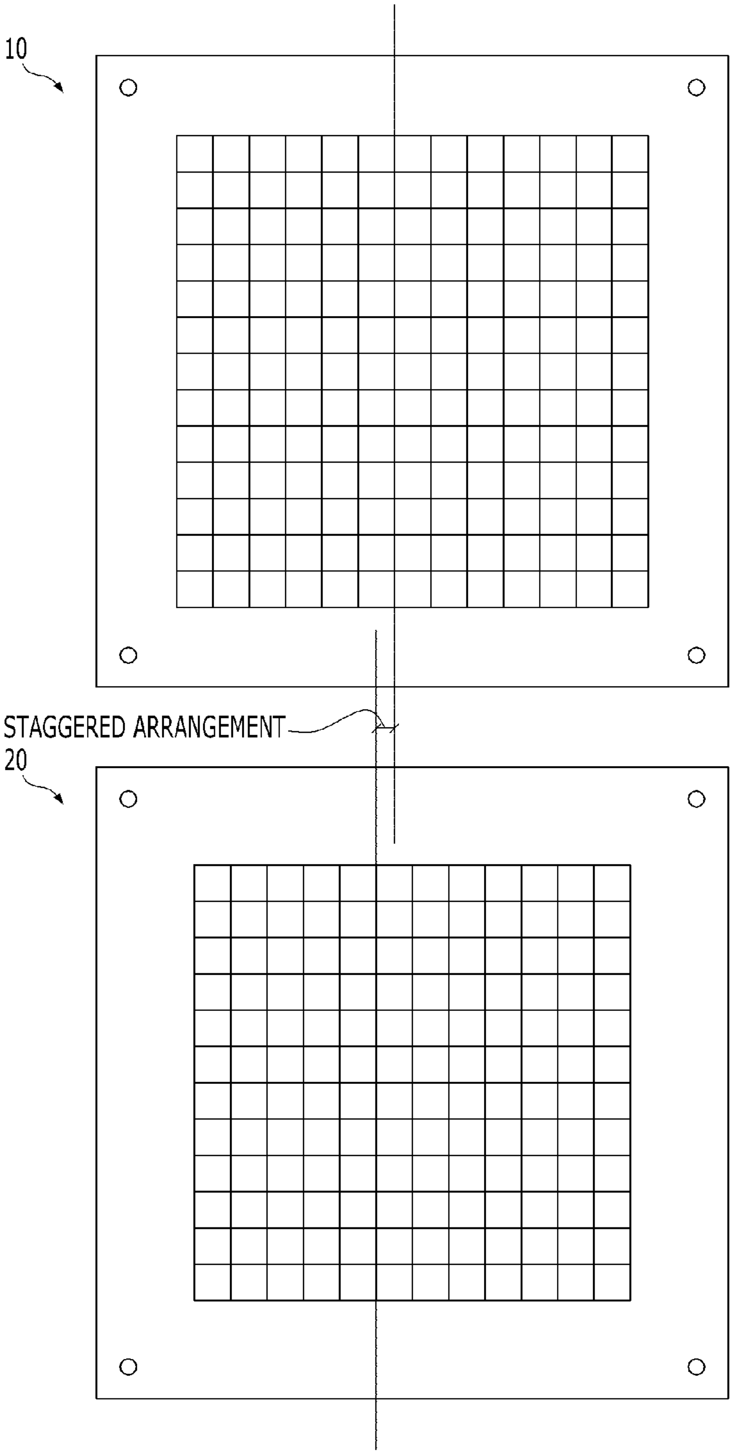
FIG. 16 is a view for explaining one embodiment in which the casing partition wall part is coated with a photocatalyst or the casing partition wall part is made of a material containing a photocatalyst without arranging the photocatalytic balls in the photocatalytic air-conditioning filter module according to the embodiment of the present application.

Meanwhile, FIG. 16 is a view for explaining one embodiment in which the casing partition wall parts 10 and 20 are coated with the photocatalyst or the casing partition wall parts 10 and 20 are made of a material including the photocatalytic material without arranging the photocatalytic ball 50 in the filter module.

Referring to FIG. 16, in the present application, the filter module excludes the photocatalytic ball 50. Instead, an interval between the first and second casing partition wall parts 10 and 20 is smaller (e.g., 1 mm to 2 mm, but the present application is not limited thereto), and the casing partition wall parts 10 and 20 may be coated with the photocatalyst or made of the photocatalyst. Even in this case, the first and second casing partition wall parts 10 and 20 are disposed in a staggered manner. The infectious source (virus or bacteria) in the air passing through the lattice-shaped spaces 12 and 22 disposed in a staggered manner may come into contact with the photocatalytic material existing on the surfaces of all the partition walls, thereby implementing antiviral or antibacterial performance against the infectious source (virus or bacteria).

For example, referring to FIG. 16, one embodiment of the filter module excluding the photocatalytic ball 50 may include the first and second casing partition wall parts 10 and 20. In addition, one embodiment of the filter module excluding the photocatalytic ball 50 may be configured such that the partition wall of the second casing partition wall part 20 traverses the lattice-shaped space 12 of the first casing partition wall part 10 or the partition wall of the first casing partition wall part 10 traverses the lattice-shaped space 22 of the second casing partition wall part 20 when viewed from the front or rear side. In addition, in the embodiment of the filter module excluding the photocatalytic ball 50, the photocatalytic ball 50 is not disposed in the lattice-shaped spaces 12 and 22, unlike the embodiment including the photocatalytic ball 50. Therefore, the first cover 30 or the second cover 40 may be eliminated, as necessary.

In addition, the present application may provide the air purification device including the filter module in which the casing partition wall part is coated with the photocatalyst or the casing partition wall part is made of a material including the photocatalytic material without arranging the photocatalytic ball.

It will be appreciated that the embodiments of the present application have been described above for purposes of illustration, and those skilled in the art may understand that the present application may be easily modified in other specific forms without changing the technical spirit or the essential features of the present application. Therefore, it should be understood that the above-described embodiments are illustrative in all aspects and do not limit the present disclosure. For example, each component described as a single type may be carried out in a distributed manner. Likewise, components described as a distributed type can be carried out in a combined type.

The scope of the present application is represented by the claims to be described below rather than the detailed description, and it should be interpreted that the meaning and scope of the claims and all the changes or modified forms derived from the equivalent concepts thereto fall within the scope of the present application.

The invention claimed is:

1. A photocatalytic air-conditioning filter module, which is applied to a target space, the photocatalytic air-conditioning filter module comprising:

a first casing partition wall part having a plurality of first lattice-shaped spaces;

a second casing partition wall part disposed at a rear end of the first casing partition wall part in a staggered manner, the second casing partition wall part having a plurality of second lattice-shaped spaces;

a first single photocatalytic ball accommodated in each of the first lattice-shaped spaces;

a second single photocatalytic ball accommodated in each of the second lattice-shaped spaces;

a first cover configured to cover a front surface of the first casing partition wall part and prevent the first single photocatalytic ball from separating from the first casing partition wall part; and a second cover configured to cover a rear surface of the second casing partition wall part and prevent the second single photocatalytic ball from separating from the second casing partition wall part, wherein the first single photocatalytic ball has a size to be able to form a first available interval in at least one of a horizontal direction and a vertical direction of each of the first lattice-shaped spaces so that the first single photocatalytic ball moves correspondingly to a flow of air in the first lattice-shaped spaces, and the second single photocatalytic ball has a size to be able to form a second available interval in at least one of a horizontal direction and a vertical direction of each of the second lattice-shaped spaces so that the second single photocatalytic ball moves correspondingly to a flow of air in the second lattice-shaped spaces, wherein the first available interval and the second available interval are configured such that the first single photocatalytic ball and the second single photocatalytic ball partially overlap each other when viewed from a front side or a rear side even though the first single photocatalytic ball is maximally spaced apart from an adjacent second single photocatalytic ball, wherein the first cover includes ball separation prevention members, each extending across a middle portion of each of the first lattice-shaped spaces, the second cover includes ball separation prevention members, each extending across a middle portion of each of the second lattice-shaped spaces, and wherein the second casing partition wall part has a hole defined in a lateral side of the second lattice-shaped spaces, and the hole is smaller than the second single photocatalytic ball as to allow air to communicate between adjacent second lattice-shaped spaces to reduce a differential pressure while preventing the second single photocatalytic ball from passing therethrough.

2. The photocatalytic air-conditioning filter module of claim 1, wherein the first available interval and the second available interval are configured such that the first single photocatalytic ball and the second single photocatalytic ball partially overlap each other when viewed from the front side or the rear side even though no spacing distance is defined in a diagonal direction between the first single photocatalytic ball and the second single photocatalytic ball adjacent to each other.

3. The photocatalytic air-conditioning filter module of claim 1, wherein each of the first casing partition wall part and the second casing partition wall part comprises a horizontal wall and a vertical partition wall, one of the horizontal wall and the vertical partition wall has a first cut-out portion recessed rearward from the front side, the other of the horizontal wall and the vertical partition wall has a second cut-out portion recessed forward from the rear side and configured to engage with the first cut-out portion, and the horizontal wall and the vertical partition wall are coupled to each other as the first cut-out portion and the second cut-out portion engage with each other.

4. The photocatalytic air-conditioning filter module of claim 1, wherein the first single photocatalytic ball and the second single photocatalytic ball are a ball made of a photocatalyst, or a ball formed of a ceramic ball or a metal ball and a photocatalyst coated on the ceramic ball or the metal ball.

5. The photocatalytic air-conditioning filter module of claim 1, further comprising:

an active light source part configured to emit light toward the first casing partition wall part and the second casing partition wall part, wherein the active light source part is positioned forward of the first casing partition wall part or positioned rearward of the second casing partition wall part.

6. The photocatalytic air-conditioning filter module of claim 5, further comprising:

a guide frame configured to ensure a spacing distance and an air flow path between the active light source part and the first casing partition wall part or the second casing partition wall part;

a light reflection plate configured to minimize a leak of light emitted from the active light source part to outside and maximize photocatalytic activity efficiency;

an active light source driver; and a supply line configured to supply power.

7. The photocatalytic air-conditioning filter module of claim 1, wherein the first casing partition wall part or the second casing partition wall part is coated with a photocatalyst or made of a photocatalyst.

8. An air purification device comprising the photocatalytic air-conditioning filter module according to claim 1.

* * * * *